| United States Patent [19] | [11] Patent Number: 4,685,015 |
|---|---|
| Zago et al. | [45] Date of Patent: Aug. 4, 1987 |

[54] CLEANER CARTRIDGE, IN PARTICULAR FOR CLEANING AUDIO AND VIDEO TAPE RECORDERS AND PLAYERS

[76] Inventors: Giovanni Zago, Via Aprilis, 41, San Quirino (Providence of Pordenone); Giovanni Prataviera, Via Caorle, 4, Pordenone, both of Italy

[21] Appl. No.: 762,464

[22] Filed: Aug. 5, 1985

[30] Foreign Application Priority Data

Aug. 21, 1984 [IT] Italy ................................ 83402 A/84

[51] Int. Cl.⁴ .......................... G11B 5/41; A47L 25/00
[52] U.S. Cl. ..................................... 360/128; 360/137; 15/210 R
[58] Field of Search .............. 360/128, 137; 15/210 R

[56] References Cited

U.S. PATENT DOCUMENTS

| 3,439,922 | 4/1969 | Howard | 360/137 |
|---|---|---|---|
| 4,388,663 | 6/1983 | Becella | 360/128 |
| 4,631,616 | 12/1986 | Zago et al. | 360/128 |

FOREIGN PATENT DOCUMENTS

| 58-114324 | 7/1983 | Japan | 360/128 |
|---|---|---|---|
| 1319948 | 6/1973 | United Kingdom | 360/128 |

*Primary Examiner*—John H. Wolff
*Attorney, Agent, or Firm*—Guido Modiano; Albert Josif

[57] ABSTRACT

This cleaner cartridge for cleaning read, record, entrainment and guide parts in audio, video, and magnetic tape apparatus comprises a reservoir for the special liquid or detergent incorporated in the cartridge and removable, assemblable, refillable or replaceable as required. This reservoir is connectable to the cartridge body in any fit and is formed preferably from a soft material in any color, also transparent.

10 Claims, 7 Drawing Figures

CLEANER CARTRIDGE, IN PARTICULAR FOR CLEANING AUDIO AND VIDEO TAPE RECORDERS AND PLAYERS

BACKGROUND OF THE INVENTION

This invention relates to a cleaner cartridge, in particular for cleaning audio and video tape recorders and players, such as read, record, guide and entrainment parts thereof, such as magnetic heads, capstan shafts and pinch rollers. As is known, such cartridges comprise a reservoir for a detergent liquid having the task of moistening the cartridge parts which will come in contact with the parts to be cleaned of tape recorders or players.

The current state of the art provides different systems for cleaning the main parts of such apparatus as tape recorders or players, for which patent applications have been filed also by the same applicants. However, all these systems provide for the reservoir to be incorporated immovably in the cleaner cartridge or to be attached externally thereto in the form of a small dropper bottle.

In the former case it is impossible to wipe all of the moving or fixed parts of the cartridge which will come in contact with the apparatus parts to be cleaned, and in the latter case the use of a cartridge with a small bottle becomes more unwieldy and expensive.

SUMMARY OF THE INVENTION

Thus, the task of the present invention consists in providing a new cleaner cartridge of the type indicated, which overcomes the drawbacks of the systems according to the prior art, and in particular allows cleaning of its moving or fixed part coming in contact with the apparatus to be cleaned and has small overall dimensions.

This task is solved with a cleaner cartridge, in particular for cleaning audio and video tape recorders and players, comprising a cartridge body and a detergent reservoir, characterized in that said detergent reservoir is externally attached to said cartridge body and forms therewith an assembly having external shape suitable for insertion in usual audio and video tape recorders and players and correspondent to usual tape cassettes, said detergent reservoir, being selectively disassemblable, assemblable, replaceable, and refillable.

In detail, it has been thought of providing the cleaner cartridge or cassette, in a suitable size to fit inside the apparatus, complete with all its members for that operation, that is with the cleaning devices, related drive members, fixed or moving fabric pads, or mere soft brushes, and with the dropper detergent reservoir assemblable to the cartridge in any way of the interlocking type, readily removable for use and replaceable or refillable depending on requirements.

It is here necessary to draw a distinction between the various uses for cleaner cartridges, and precisely between those for audio apparatus and those for video apparatus because the techniques are different.

The cassettes for audio recorder-players are to a standard and uniform size for all types and makes of apparatus, thereby it is sufficient to provide the cleaner cartridge or cassette including a removable, assemblable reservoir. This reservoir may have any outward geometric configuration and thickness, with the only restriction that the assembly should conform to the standard, and may be assembled by interlocking or by any other means suitable to hold it united with the cleaning part.

The discourse is different with cleaner cartridges of the video type in that they come in different sizes according to their manufacturers; however, the concept of this invention is still the same. In fact, the pull-out assembly reservoir is still formed with the overall dimensions of the cartridge, according to the particular video apparatus to be cleaned. In this case, as hereinbefore, the removable dropper or spray reservoir is detached from the cartridge and used to moisten the parts affected by the cleaning.

In the instance of the video the parts to be cleaned are different from those of the audio player-recorders, here the parts to be cleaned are only accessible by a tape thereby the cleaner cartridge comprises a tape which will contact the video ahead and guide and entrainment devices. Therefore, in addition to the removable reservoir, which can be interlockingly assemblable to form the cleaner cartridge, there are other possible embodiments of said video type cartridge: (1) to provide a single fixed tape which cleans the affected parts; (2) to provide within the cassette a multiuse windable tape cartridge which cannot be pulled out, of the unwinding and winding type so as to present a different surface of the cleaning tape; (3) to provide still within the cartridge a pull-out replaceable cartridge of the fixed type as in the first case; (4) to provide within the cassette, a cartridge according to case (2) but of the pull-out, interchangeable type in order to increase the utilization and life of the cleaning combination.

As asserted, the main object of this invention is a cleaning cartridge with a reservoir for a detergent or special liquid for cleaning recorders and players parts contacting audio or video tapes, which is incorporated in the overall dimensions of the cartridge and made slippable out as required for use and then assemblable thereto in any fitting system so as to occupy no more space in addition to the outline one occupied by a standard tape cassette.

BRIEF DESCRIPTION OF THE DRAWINGS

Some embodiments of this invention are shown by way of example, albeit not of limitation, on the two accompanying drawing sheets, where.

DESCRIPTION OF THE PREFERRED EMBODIMENTS

According to the invention and in conformity with the embodiments shown in the aforesaid figures, the cleaner device for audio or video recorder-player apparatus is composed of a standard container with suitable cleaning devices and with at least one reservoir containing a special liquid and/or detergent, removable and easily assemblable, if necessary replaceable and/or refillable.

Figure 1:
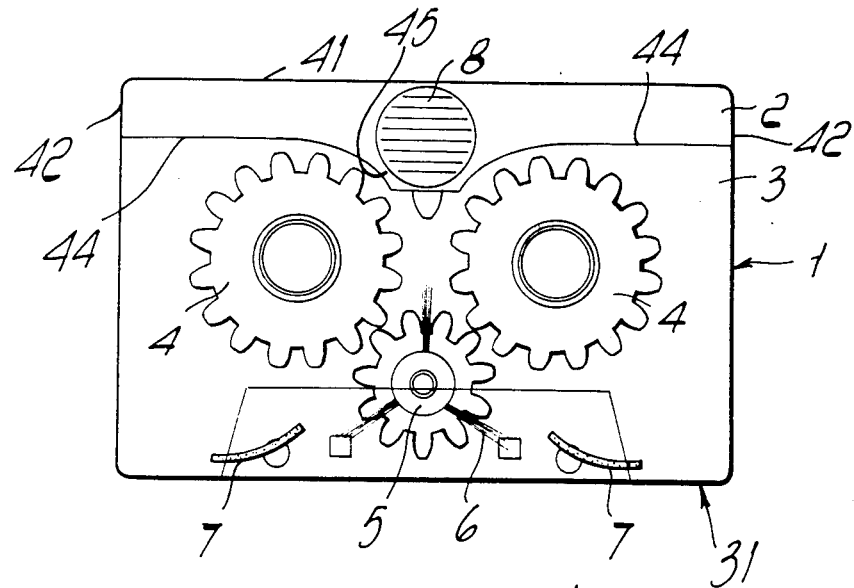
FIG. 1 is a front view of a cleaner (transparent) cartridge to bring out the parts involved in cleaning audio recording-playing apparatus with the removable reservoir incorporated.
Figure 2:
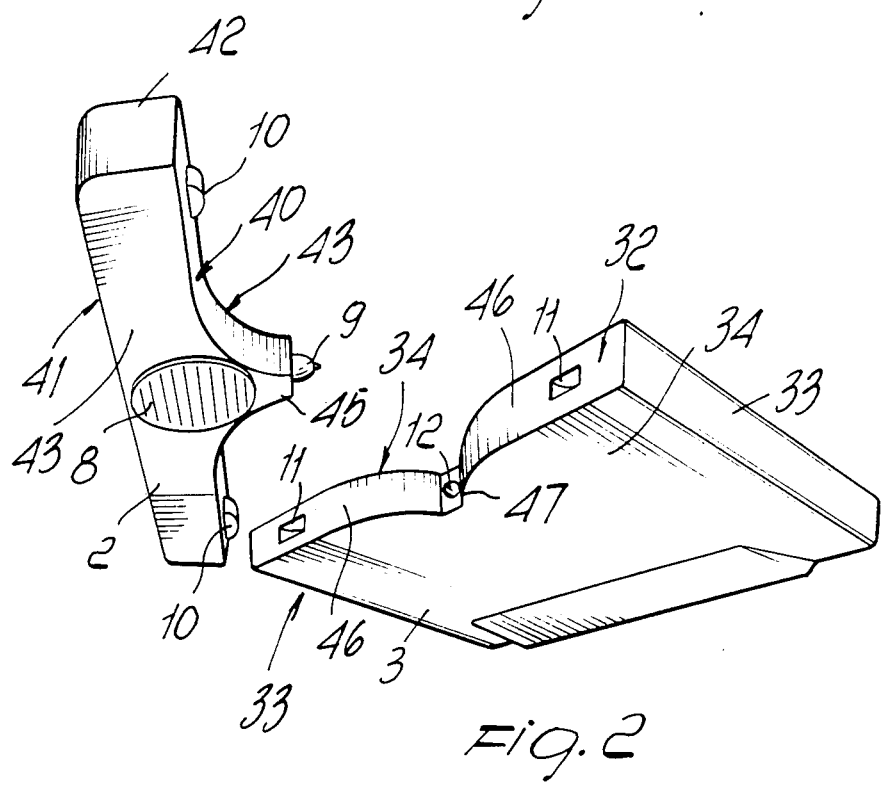
FIG. 2 is an exploded perspective view of the cartridge of FIG. 1 emphasising the reservoir and the remainder of the cleaner cartridge.

From FIGS. 1 and 2 a first solution for audio apparatus is noticeable. The standard cartridge 1 is composed of two removable and re-assemblable parts, i.e. the reservoir 2 (made of a pressure deformable plastics material) and the cartridge body 3, which can be connected to each other by means of fitting points formed by the protruding portions 10 on the reservoir 2 which cooperate with recesses 11 in the cartridge body 3, thereby defining therewith cooperating removable connection means, and by the nozzle 9 on the reservoir 2 cooperating with a stopper 12 formed in the cartridge body 3. In detail, as visible from the drawings, the cartridge body 3 has a substantially box-like flattened configuration having at least one longer, thin front face 31, three thin lateral delimitation faces including a longer, thin rear wall 32 extending opposed at a distance from the thin front face 31 and two shorter, thin side walls 33 extending at a distance to each other between the thin front fae 31 and the thin rear wall 32, and two larger upper and lower walls 34 extending parallel to each other between the thin front and thin lateral delimitation faces. In practice, as visible, the thin rear, thin side and larger upper and lower walls 32-34 separate a cartridge body interior from a cartridge body exterior. As also visible, the detergent liquid reservoir 2 has a hollow box-like configuration including at least a thin front attachment wall 40, an opposed thin rear delimitation wall 41, two thin lateral delimitation walls 42 extending at a distance from each other, and two upper and lower delimitation walls 43 extending parallel to each other between the front attachment, rear delimitation, and lateral delimitation walls 40-43. As shown in the drawing, the front attachment wall 40 of the detergent liquid reservoir 2 and the thin rear wall 32 have mutually fitting shapes. In detail, the front attachment wall 40 of the detergent liquid reservoir 2 presents two flat side portions 44 and one outwardly protruding middle portion 45 carrying the drop ejection nozzle 9, while the longer, thin rear wall of the cartridge body has two flat end portions 46 and one inwardly protruding middle portion 47 with a shape fitting to the outwardly protruding middle portion 45 of the thin front attachment wall, the inwardly protruding middle portion 47 of the cartridge body having a recess defining the nozzle stopper 12. In practice, as visible from FIG. 1, the substantially box-like configuration of the cartridge body 3 and the hollow box-like configuration of the detergent liquid reservoir 2 define, in a mutually connected condition, a substantially parallelpipedal shape with outer dimensions correspondent to usual tape cassettes, with the cartridge body extending adjacent to the detergent liquid reservoir. The reservoir 2 is provided with a pressure zone 8 for the ejection of the liquid through the nozzle 9, whereas the cartridge body 3, which is the proper cleaning zone, is provided with moving mechanisms, such as small toothed wheels 4, and a central small toothed wheel 5 carrying small brushes 6 for cleaning the heads while laterally thereto fixed small felts 7 are provided for cleaning entrainment devices, capstan, and pinch roller.

Figure 3:
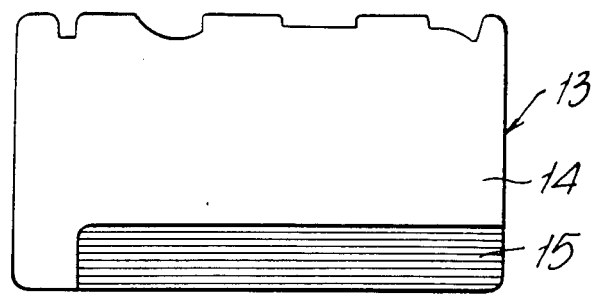
FIG. 3 is a front view of a basic type of cleaner cartridge for video recorder-players with the removable reservoir incorporated.
Figure 4:
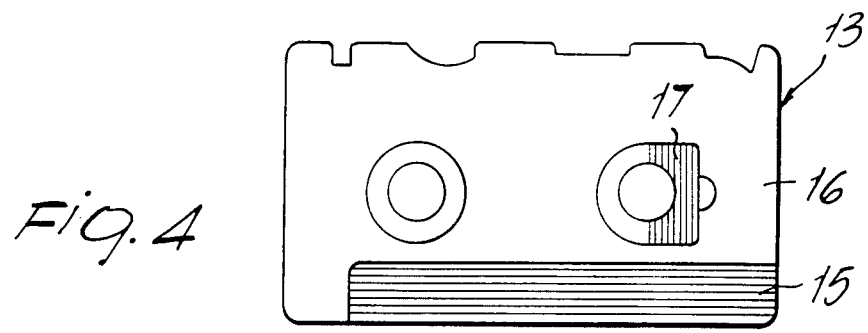
FIG. 4 is a front view of a type of multipurpose cleaner cartridge for video recorder-players still with the removable reservoir incorporated.
Figure 5:
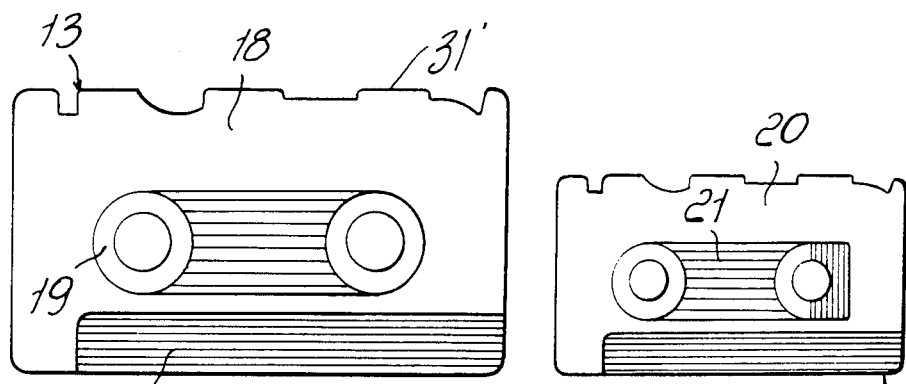
FIG. 5 is a front view of another type of video cleaner cartridge, also multipurpose and with the reservoir incorporated, removable and with a replaceable and not windable cleaning tape cartridge.
Figure 6:
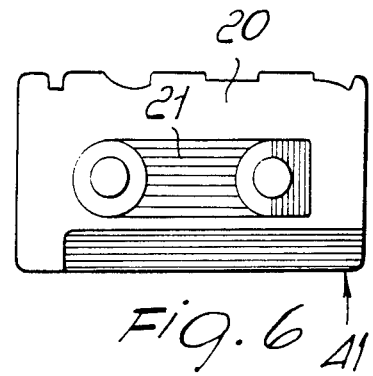
FIG. 6 is a front view of still another type of multipurpose cleaner cartridge cassette with a windable and interchangeable cartridge still with the reservoir incorporated.
Figure 7:
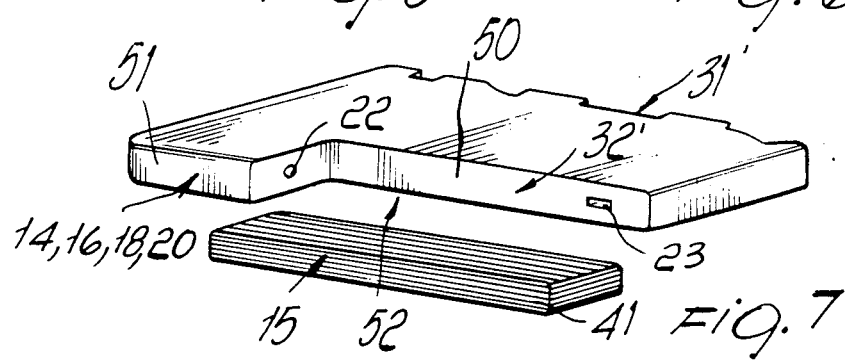
FIG. 7 shows in a diagramatic exploded perspective view the video type cartridge to bring out the detergent liquid reservoir and the remainder of the cartridge.

FIGS. 3-7 show various embodiments of the cleaner cartridge for video recorder-players according to the invention. The cartridge 13 shall have the shape and bulk suitable for the specific apparatus for which it is designed and is composed also in this case of two parts, i.e. the reservoir 15 for the detergent liquid and the cartridge body provided with a cleaning tape or other suitable device. In FIG. 3, the video-type cartridge 13 has a non-replaceable tape cleaner device 14. In FIG. 4, the cartridge 13 comprises an improved cleaning part 16 and is adapted to wind with an appropriate handgrip 17 the dirty cleaning tape, so as to make it a multiuse model. In the case of FIG. 5 the cartridge body 18 has an interchangeable cartridge tape cleaning device 19. Finally in FIG. 6 the cartridge 20 has a tape cleaner device 21 with a windable and interchangeable cartridge, therefore the life of the cartridge is greatly increased. As shown in FIG. 7, all the embodiments according to FIGS. 3-6 comprise fitting points such as 22, 23 on the cartridge bodies 14, 16, 18 and 20 cooperating with correspondent fitting points (not shown) on the reservoir 15 so as to allow connection of the two parts of the cartridge 13. As visible, in all the embodiments shown in FIGS. 3-7, the longer, thin rear wall 32' is defined by a first flat portion 50 extending parallel to and at a distance from the thin front face 31' and by a second flat portion 51 extending parallel to the first flat portion 50 and the thin front face 31' at a greater distance from the thin front face 31' than the first portion 50. The first and second flat portions 50, 51 define together a recessed portion 52 of the cartridge body 14, 16, 18 or 20, with the detergent liquid reservoir 15 exactly fitting in the recessed portion so that the rear delimitation thin wall 41 of the reservoir 15 is aligned with the second flat portion 51 of the longer, thin rear wall 32'.

Of course, the invention is not limited to the exemplary embodiments described above, from which other forms and embodiments may be envisaged, and the details of construction may anyhow vary, without in so doing deviating from the spirit of the invention as set forth and claimed hereunder.

For example, the reservoir 2,15 can be affixed to the cartridge body by means of any suitable fixing system, e.g. by means of sleeves, rubber bands, clips and so on.

We claim:

1. A cleaner cartridge for cleaning audio and video tape recorders and players, comprising a cartridge body and a detergent liquid reservoir, said cartridge body having a substantially box-like flattened configuration having at least one longer, thin front face, three thin lateral delimitation faces including a longer, thin rear wall extending opposed at a distance from said thin front face and two shorter, thin side walls extending at a distance to each other between said thin front face and said thin rear wall, and two larger upper and lower walls extending parallel to each other between said thin front and thin lateral delimitation faces, said thin rear, thin side and larger upper and lower walls separating a cartridge body interior from a cartridge body exterior, and said detergent liquid reservoir having a hollow box-like configuration for accomodating therein a detergent liquid, said hollow box-like configuration including at least a thin front attachment wall, an opposed thin rear delimitation wall, two thin lateral delimitation walls extending at a distance from each other, and two upper and lower delimitation walls extending parallel to each other between said front attachment, rear delimitation, and lateral delimitation walls, said front attachment wall of said detergent liquid reservoir and at least one of said thin lateral delimitation faces having mutually fitting shape and cooperating removable connection means for removably securing said detergent liquid reservoir to said cartridge body at said cartridge body exterior, said substantially box-like configuration of said cartridge body and said hollow box-like configuration of said detergent liquid reservoir defining, in a mutually connected condition, a substantially parallelepipedal shape with outer dimensions correspondent to usual tape cassettes, with said cartridge body extending adjacent to said detergent liquid reservoir.

2. A cleaner cartridge according to claim 1, wherein said one of said thin lateral delimitation faces is said longer, thin rear wall.

3. A cleaner cartridge according to claim 1, wherein said front attachment wall of said detergent liquid reservoir presents protruding portions outwardly protruding from said front attachment wall and said one of said thin lateral delimitation wall has recesses facing and countershaped to said protuding portions of said front attachment wall, said protruding portions and said recesses defining interlock fitting means.

4. A cleaner cartridge according to claim 1, wherein said detergent liquid reservoir is made of a pressure deformable plastics material.

5. A cleaner cartridge according to claim 1, wherein said one of said thin lateral delimitation faces is said longer, thin rear wall, said front attachment wall of said detergent liquid reservoir presents two flat side portions and one outwardly protruding middle portion having a drop ejection nozzle for dispensing detergent liquid, and said longer, thin rear wall of said cartridge body has two flat end portions and one inwardly protruding middle portion with a shape fitting to said outwardly protuding middle portion of said front attachment wall, said inwardly protruding middle portion of said cartridge body having a recess defining a nozzle stopper.

6. A cleaner cartridge according to claim 1, wherein said detergent liquid reservoir comprises a pressure zone for causing ejection of detergent liquid from said drop ejection nozzle.

7. A cleaner cartridge according to claim 1, wherein said one of said lateral thin delimitation face is said longer, thin rear wall, said longer, thin rear wall being defined by a first flat portion extending parallel to and at a distance from said thin front face and a second flat portion extending parallel to said first flat portion and said thin front face at a greater distance from said thin front face and defining with said first flat portion a recessed portion of said cartridge body, said detergent liquid reservoir exactly fitting in said recessed portion with said rear delimitation thin wall being aligned with said second flat portion.

8. A cleaner cartridge for cleaning audio and video tape recorders and players, comprising a cartridge body and a detergent liquid reservoir, said cartridge body having a substantially box-like flattened configuration having at least one longer, thin front face, three thin lateral delimitation faces including a longer, thin rear wall extending opposed at a distance from said thin front face and two shorter, thin side walls extending at a distance to each other between said thin front face and said thin rear wall, and two larger upper and lower walls extending parallel to each other between said thin front and thin lateral delimitation faces, said thin rear, thin side and larger upper and lower walls separating a cartridge body interior from a cartridge body exterior, said cartridge body interior accomodating audio and video tape recorders and players cleaning means, and said detergent liquid reservoir having a hollow box-like configuration for accomodating therein a detergent liquid, said hollow box-like configuration including at least a thin front attachment wall, an opposed thin rear delimitation wall, two thin lateral delimitation walls extending at a distance from each other, and two upper and lower delimitation walls extending parallel to each other between said front attachment, rear delimitation, and lateral delimitation walls, said front attachment wall of said detergent liquid reservoir and at least one of said thin lateral delimitation faces having mutually fitting shape and cooperating removable connection means for removably securing said detergent liquid reservoir to said cartridge body at said cartridge body exterior, a detergent liquid ejection nozzle on said detergent liquid reservoir, said detergent liquid reservoir being at least partially made of a pressure deformable plastics material for allowing detergent liquid dispensing through said detergent liquid ejection nozzle upon squeezing, said substantially box-like configuration of said cartridge body and said hollow box-like configuration of said detergent liquid reservoir defining, in a mutually connected condition, a substantially parallelepipedal shape with other dimensions correspondent to usual tape cassettes, with said cartridge body extending adjacent to said detergent liquid reservoir.

9. A cleaning cartridge according to claim 8, wherein said detergent liquid ejection nozzle is arranged on said front attachment wall of said detergent liquid reservoir, a recess being formed in said one of said thin lateral delimitation face at a location facing said detergent liquid ejection nozzle in said mutually connected condition of said cartridge body and said detergent liquid reservoir, said recess defining a nozzle stopper.

10. A cleaning cartridge according to claim 8, wherein said one of said thin lateral delimitation faces is said longer, thin rear wall.

* * * * *